US006613142B1

(12) United States Patent
D'Almeida et al.

(10) Patent No.: US 6,613,142 B1
(45) Date of Patent: Sep. 2, 2003

(54) STORABLE COMPOSITIONS AND SLURRIES AND USE OF SAME FOR CEMENTING OIL AND GAS WELLS

(75) Inventors: Arnaldo Rodrigues D'Almeida, Rio de Janeiro (BR); Cristiane Richard De Miranda, Rio de Janeiro (BR); Gilson Campos, Niterói (BR)

(73) Assignee: Petroleo Brasileiro S.A.- Petrobras, Rio de Janiero (BR)

( * ) Notice: Subject to any disclaimer, the term of this patent is extended or adjusted under 35 U.S.C. 154(b) by 0 days.

(21) Appl. No.: 09/613,724

(22) Filed: Jul. 11, 2000

(30) Foreign Application Priority Data

Jul. 13, 1999 (BR) .............................. 9902726

(51) Int. Cl.[7] .......................... C04B 7/14; C04B 7/153
(52) U.S. Cl. ...................................... 106/789; 106/790
(58) Field of Search ................................. 106/789, 790

(56) References Cited

U.S. PATENT DOCUMENTS

| | | | | |
|---|---|---|---|---|
| 4,210,456 A | * | 7/1980 | Miller | |
| 5,058,679 A | | 10/1991 | Hale et al. | 166/293 |
| 5,067,981 A | * | 11/1991 | Hooykaas | 106/790 |
| 5,106,423 A | * | 4/1992 | Clarke | 106/789 |
| 5,409,064 A | | 4/1995 | Cowan | 166/293 |
| 5,447,197 A | | 9/1995 | Rae et al. | 166/293 |
| 5,547,506 A | | 8/1996 | Rae et al. | 106/730 |
| 6,173,778 B1 | * | 1/2001 | Rae et al. | 166/293 |

FOREIGN PATENT DOCUMENTS

| | | | |
|---|---|---|---|
| DE | 4121776 | * | 1/1993 |
| EP | 522347 | * | 1/1993 |

OTHER PUBLICATIONS

J.W. Anderson, et al, "New Technology Improves Cement Slurry Design", Society of Petroleum Engineers, Inc. (1996) p. 128–136.

* cited by examiner

*Primary Examiner*—Paul Marcantoni
(74) *Attorney, Agent, or Firm*—Sughrue Mion, PLLC

(57) ABSTRACT

Storable compositions and slurries for cementing oil and gas wells are described which comprise blast-furnace slag besides other additives which are usual in the cementing technique. The compositions and slurries are insufficiently activated (or are activated immediately before introducing them into the well), so that they can be stored for at least 72 hours (alternatively they may be stored indefinitely) without the setting of the composition and dispense with the addition of activation inhibitors. The use of the compositions and slurries in the cementing of oil and gas wells is also described.

28 Claims, No Drawings

STORABLE COMPOSITIONS AND SLURRIES AND USE OF SAME FOR CEMENTING OIL AND GAS WELLS

FIELD OF THE INVENTION

The present invention relates to compositions and slurries for cementing oil and gas wells as well as to the use of such slurries in those wells, and specifically to compositions and slurries containing blast furnace slag to be used in water-based fluids as hydraulic material, in the absence of set inhibitors, such slurries being storable at ambient temperature.

BACKGROUND INFORMATION

The usual procedure for drilling an oil and gas well comprises drilling the well using a drilling fluid. Then, a casing is introduced in the well and a cementitious slurry is placed in the annulus between the outer portion of the casing and the borehole wall. The purpose of the cementitious slurry is to harden and provide efficient sealing between the casing and the well. The outer shell of hardened cement impedes or inhibits the fluid communication among the various formations penetrated by the well. Besides providing isolation among zones, the cement contacts the casing and provides mechanical support and strength to axial movement through the adherence developed between the interfaces of cement and casing as well as between the interfaces of the cement and the formation.

Besides the proper features of adherence between the cement and the casing and between the cement and the formation, of compatibility between the cementitious slurry and the drilling fluid, of the compressive strength and of the rheological parameters, another important feature is the set time (or hardening time) of the slurry compositions. Normally, slurries contain additives for the control of set time (activators and retarders) and rheology-modifying additives.

The set activating additives are used in the cementitious slurries aiming at avoiding long waiting times (up to ca 24 hours) until the slurry hardens, after the slurry being placed in the desired site of the annulus of the well.

The patent literature is abundant in publications dealing with applications of blast furnace slag together with water based drilling fluids.

Thus, U.S. Pat. No. 5,058,679 teaches the in situ solidification of water based fluids by adding blast furnace slag, additives for controlling the set time, as well as rheology modifiers. After addition for example 50 to 400 lb/bbl slag, the drilling fluid is displaced to the annulus and left to harden. The setting time of the drilling fluid treated with slag may be varied according to the temperature conditions of the well and the requirements for the displacing time. Set times are controlled between around one hour and up to several days for temperatures between 40 and 400° F. (4 and 204° C.).

U.S. Pat. No. 5,409,064 teaches a composition and method for cementing a well by combining ingredients which comprise water and blast furnace slag of particle size between 2,000 $cm^2/g$ and 15,000 $cm^2/g$ (200 $m^2/kg$ and 1,500 $m^2/kg$), preferably between 4,000 $cm^2/g$ and 6,500 $cm^2/g$ (400 $m^2/kg$ and 650 $m^2/kg$) and an activator which comprises sodium pyrophosphate to form a cementitious slurry; displacing the cement slurry to the well, and allow the cementitious slurry to set.

U.S. Pat. No. 5,447,197 teaches storable cementitious slurries made from cementing hydraulically active material, which may be stored in the liquid state. The slurry is activated when needed for cementing. After pumping the activated slurry to the interior of the well, the properties of the hardened cement are suitable for well cementing. The composition contains a set retarder aiming at maintaining the slurry in the liquid state while stored, and an activator to revert tho retardation caused by the retarder.

U.S. Pat. No. 5,547,506 teaches liquid storable cementitious slurries made from hydraulically active cementitious material, a set inhibitor to allow storage of the slurry and an activator to activate the slurry.

A paper published by the Society of the Petroleum Engineers (SPE) n° 36973, of October 1996, teaches a new technology for cementing of slim wells with the aid of Liquid Cement Premix (LCP), such technology having the advantage of providing slurries having a more uniform density while dispensing with the use of expensive mixers in the field.

Conceptually, LCP is a storable cement slurry which may be indefinitely kept in the liquid state so that the set is determined as required. The slurry is a pre-mix of Portland cement or any other hydraulic material containing set inhibitors and other additives. Such system requires the use of an activator, which is added immediately before pumping the slurry to the well. The activator resumes hydration and allows that the slurry sets and develops compressive strength. The LCP properties may be adjusted with the aid of the additives used in conventional cementing operations. The slurry is compatible with all the usual cementing additives. LCP attains the usual densities. Values of compressive strength developed after around 3 hours are suitable for well cementing. The range of useful temperatures extends from ambient temperatures to 450° F. (230° C.).

Thus, the literature teaches cementing slurries which use water based drilling fluids and blast furnace slag as hydraulic material, the slurries being pumped to the well soon after being made. The cementing slurries of the state-of-the-art technique necessarily comprise the use of retarders/activators, this representing the presence of more reagents in the composition, besides higher cost. So, the technique is still in need of compositions and storable cementitious slurries for well cementing which may be stored at ambient temperature, dispensing with the use of inhibitors/activators, such compositions and slurries being provided for by the present invention.

SUMMARY OF THE INVENTION

The storable compositions of cementitious slurries for oil and gas wells of the present invention are based on the presence of blast furnace slag as the hydraulic material as well as on specific amounts of other components of the composition, the compositions and slurries being free of set retarders.

The storable compositions of cementitious slurries according to the present invention comprise:

Of from 200 to 500 lb of blast furnace slag/bbl of slurry (570 to 1428 kg of blast furnace slag/ $m^3$ of slurry);

Of from 0.01 to 13 weight % of activators, based on the weight of blast furnace slag;

The balance being made up of water based fluid,

The composition may still contain other usual additives for cementing and drilling fluid for oil and gas wells. Contrary to the storable compositions of cementitious slurry of the state-of-the-art technique, the storable compositions of the present invention are formulated in the absence of any amount of set retarders.

In terms of concentration, the compositions are defined as: blast furnace slag, kg/m$^3$, the activators, weight % based on the weight of blast furnace slag and the possible additives, weight % based on the weight of blast furnace slag or kg/m$^3$.

Water or a water-based drilling fluid or a mixture of same constitute the continuous medium.

Another composition of cementitious slurry according to the invention contains zero per cent activators at the time of the preparation, the activators being added immediately before pumping the slurry to the wellbore.

Still another composition of cementitious slurry according to the invention contains a portion of the activators at the moment it is prepared the remaining of the activators being added immediately before pumping the slurry to the wellbore.

In view of the three parameters which control the setting time of the slag-containing cementitious slurries:

physical and chemical properties (surface area, vitrification degree and chemical composition) and concentration of the blast furnace slag;

kind and concentration of chemical activators;

wellbore temperature,

The principle on which are based the compositions of the invention storable at ambient temperature in the absence of set retarders relates to the control of the blast furnace slag and the chemical activators.

It should be understood that the temperature of the wellbore where the slurries will be utilized varies within broad limits and that such parameter cannot be controlled.

Still under another point of view, the compositions and storable slurries of the present invention may be considered as insufficiently activated, so that the set does not occur at the surface (out of the well). Activation will only occur when the compositions and cementitious slurries are chemically and thermally activated this occurring through addition of activators and by the inner temperature of the wellbore. Thus, without the need of the set retarders of the state-of-the-art, liquid slurries are obtained which are storable at ambient temperatures during prolonged periods, for example, 72 hours or more.

Thus, the present invention provides compositions and cementitious slurries storable at ambient temperature to be utilized in oil and gas wells, vertical, deviated and horizontal wells, said slurries being formulated based on blast furnace slag as hydraulic material, activators, water-based drilling fluid or water, or a mixture of same, as well as usual additives for drilling fluid and cementing slurries.

The present invention provides further compositions and cementitious slurries storable at ambient temperature where the slurry is completely free of activator, the activator being added immediately before the slurry is pumped to the wellbore.

The present invention provides still compositions and cementitious slurries storable at ambient temperature where the slurry contains a portion of the activator required for the set while another portion of the activator is added immediately before the slurry is pumped to the well.

The present invention provides further compositions and cementitious slurries storable at ambient temperature where the proper amount of the activation parameters allows that the slurry be kept in the liquid state for prolonged periods of 72 hours or more, dispensing with retarders specifically designed to retard the setting of the slurry compositions as well as activators for reversing the effect of the retarder.

Still, the present invention provides an improvement in the operation of oil and gas well cementing through the homogeneity of the slag-containing slurry, which is obtained without the risk of setting at the surface as well as by the simplicity in the operation, this yielding less risk of operation failure and lower operation period.

DETAILED DESCRIPTION OF THE PREFERRED MODES

The preferred modes described below together with the attached Examples illustrate the principles of the invention.

For the purposes of the present specification and claims, set retarder, or retarder, is every additive utilized in the slurry aiming at preventing the hardening or setting of the slurry before said slurry is pumped to the well annulus, and set inhibitor or inhibitor is every additive utilized in the slurry aiming at allowing the storage of same in the liquid state for prolonged periods, for example 72 hours or more.

Advantageously, the present invention provides compositions and storable slurries aiming at the well cementing which may be prepared in advance, stored, moved and taken to the site of utilization at the most convenient time, without the need of immediate use common to the state-of-the-art slurries. Such advantage is obtained exclusively by adjusting the relative amounts of the slurry constituents, dispensing with set inhibitors and activators to revert the action of the inhibitors, such as is well known for the conventional slurries.

The state-of-the-art cementing operation requires that the slurry is displaced to the wellbore as soon as the hydraulic material is mixed to the mixing water (water plus additives), in order to prevent that the set occurs in the tanks and cementing lines or still within the casing. Any of these situations constitute an operation drawback, besides damages for loss of material, working hours and waste of rig time, and even ultimately loss of the well. This way of conducting the cementing operation, by mixing hydraulic material and mixing water, followed by displacement to the wellbore causes a variation in the concentration of hydraulic material in the slurry, this in turn entraining a variation in physical properties (density, compressive strength, etc.) which possibly leads to low quality cementing to be corrected by squeezing, with the consequent increased costs One way to avoid the oscillation in the concentration of hydraulic material is to utilize a mixer able to prepare the entire required amount for the cementing operation in one single batch (a so-called batch-mixer). However the slurry prepared using this type of mixer increases the cost of the cementing operation of oil and gas wells.

Typically, cementitious slurries comprise cement, fresh or salted water and various other additives such as extenders, strength retrogression controllers, accelerators and retarders, fluid loss additives, dispersants and weighting agents.

In order that the cementitious slurries show the desired properties, various additives are being used. Non-limiting examples are bentonite, silica, calcium chloride, lignosulfonate and related products, boric acid, hydroxy ethyl cellulose, carboxy methyl cellulose and other cellulose derivatives, tartaric acid, citric acid and other carboxylic acids, naphthalene sulfonic acid salt, barite and hematite.

In the present specification and claims, the term "water base fluid" means a fluid wherein the continuous phase is water. Non-limiting examples are fresh water, brine, sea water or other aqueous fluids isolated or combined, such as water-based drilling fluids.

Water-based drilling fluids typically comprise water and various other additives such as viscosifiers, fluid loss additives, dispersants, dissolved salts, alkaline agents, solids from the perforated formation, weighting agents, formation stabilizers, lubricants for the drilling fluid and anti-foaming agents.

In order that the drilling fluids show the desired properties, various additives have been used. Non-limiting examples are bentonite, polyacrilamide, guar gum, xanthan gum, carboxy methyl cellulose, starch, tannin compounds, lignosulfonate, polyacrylate, sodium chloride, potassium chloride, calcium chloride, sodium hydroxide, potassium hydroxide, calcium hydroxide, clays, barium sulfate or barite, iron oxide, calcium carbonate, lubricating oil, octylic alcohol and aluminum stearate.

The solidification of a drilling fluid may be obtained by adding blast furnace slag as hydraulic material together with additives for the control of set time and Theological properties of the fluid, which has been slag-treated.

Blast furnace slag is a non-metallic product, which consists essentially of calcium silicates and calcium aluminosilicates, and other bases, and is produced in the melt state simultaneously with iron in a blast-furnace. Blast-furnace slag is therefore a by-product of the manufacture of iron and results from the combination of minerals from the residuum of the iron ore, the coke ashes and from the lime used as smelter. As the density of slag is lower than that of iron, the slag is poured in the melt as the upper phase at temperatures usually between 2250° C. and 2900° C. Such mixture is then quickly cooled aiming at obtaining glassy and powdery material, able to develop hydraulic activity.

Blast furnace slag (or slag) shows the same compounds as cement, however, at different concentrations. TABLE 1 below illustrates the typical chemical composition of blast furnace slag and Portland Cement Class G, both Brazilian made.

TABLE 1

| COMPOSITION | BLAST FURNACE SLAG (WEIGHT %) | PORTLAND CEMENT Class G (weight %) |
| --- | --- | --- |
| CaO | 33 to 44 | 48 to 52 |
| $SiO_2$ | 32 to 44 | 26 to 29 |
| $Al_2O_3$ | 12 to 20 | 7 to 11 |
| MgO | 1 to 7 | 4 to 6 |
| $Fe_2O_3$ | 0 to 2 | 2 to 3 |
| FeO | 0 to 2 | — |
| $K_2O$ | 0 to 2 | <1 |
| $Na_2O$ | <0.5 | <0.3 |
| $TiO_2$ | <1 | — |
| $Mn_2O_3$ | <1 | — |
| $SO_3$ | <0.1 | 1.5 to 2.5 |
| S | 0 to 1 | <0.5 |
| Fe | <1 | — |

The hydration process of slag involves the dissolution of the anhydrous compounds, followed by the precipitation of the hydrated compounds. The agglomerating properties of the slag depend on proper activation.

Thus, slag is considered a latent hydraulic compound, since it needs activation to set. The required activation may be provided by thermal energy, chemical activators or through mechanical energy. The activation increases the solubility of slag and/or favors the precipitation of the hydrated compounds.

The mechanical activation is obtained by milling slag: the higher the surface area, the larger the dissolution of slag. The particle reduction in size increases surface area, and therefore the contact area, this increasing the hydration rates.

Thermal activation is obtained by increasing the temperature of the slag, this also increasing the solubility of the slag in solution.

Chemical activation occurs through the combination of two parameters: increase in the rate of dissolution of slag caused by an increase in pH, and anticipation of precipitation of the hydrated compounds through increase in the concentration of ions in solution or by altering the solubility of the slag compounds.

The high pH of the slag-containing solution increases the slag solubility, and consequently its hydration, since the dissolution of same is effected through a hydroxyl attack (that is, attack by OH ions), while the dissolution of the cement clinker occurs through a hydrolytic attack (that is, the action of water molecules). Hydroxyl ions may be provided either by strong bases, such as sodium hydroxide, sodium silicate of low $SiO_2/Na_2O$ ratio or by weak bases, such as sodium carbonate, or sodium silicate of high $SiO_2/Na_2O$ ratio.

The reactivity of the slag depends on various parameters, such as degree of vitrification, chemical and mineralogical composition and fineness.

The degree of vitrification dramatically increases reactivity: crystalline slag, obtained by slow cooling, does not hydrate. The fastest the cooling, the higher the vitrification degree of the slag, and therefore the larger the hydraulic potential of the slag. Experimental data indicate the presence of 3 to 5 weight percent of crystals in the slag in order to improve their reactivity.

The chemical composition of slag is related to the quality of the iron ore, as well as to the nature of the smelter, to the utilization of coke or charcoal as fuel, reduction activator, etc. Broadly speaking, a basic slag is more reactive than acidic ones.

Regarding to the fineness, which may be evaluated by determining the surface area, the higher the surface area, the larger the reactivity. Analogously, the higher the temperature, the greater the reactivity of a sample of slag.

In spite of the fact that several kinds of slag may be useful for the purposes of the present invention, a preferred slag is a blast furnace slag, a by-product of the manufacture of blast iron, having a vitrification degree higher than 90 weight % and surface area between 200 and 600 $m^2/Kg$.

The rheological properties of the drilling fluid compounded with slag may be modified with the aid of conventional chemical dispersing agents for water-based drilling fluids, such as lignosulfonates, naphthalene sulfonates, phenol sulfonates, phosphates, phosphonates, sulphonated styrene-maleic anhydride, polyacrylate, polymethacrylates, mixtures of polyacrylate and polymethacrylates, acrylic acid-acrylamide copolymers, or mixtures of any of these classes provided the compounds are chemically compatible so as to mix while retaining the ability of dispersing particles in the drilling fluid.

In view of the fact that slag is a latent hydraulic material, activation is required in order to obtain a slurry of useful features. The activation of slag-containing drilling fluid usually requires the use of chemical activators besides the thermal activation. In the compositions taught in the open literature, chemical activators are used in such amounts as to effect the set in relatively short times, from a few minutes to a few hours.

As chemical activators, acids and bases may be used, such compounds increasing the pH of the liquid portion of a mixture of water-based fluid/blast furnace slag. In view of the fact that the thermal energy contributes to the overall activation energy, the kind of chemical activators and the amount of same may vary. Strong bases are usually employed at low temperatures while weak bases may be used when the temperature is higher.

The activator constituents may be a mixture of bases or bases combined to chelating, complexing or sequestering agents.

At low temperatures it is advisable to use hydroxides of alkaline and earth alkaline metals such as lithium hydroxide, sodium hydroxide, potassium hydroxide, calcium hydroxide, magnesium hydroxide and barium hydroxide. The more soluble hydroxides are more adequate activators for low temperatures. It is believed that the higher solubility in water at low temperatures is the main reason for the better performance of these activators at low temperatures. That is why more commonly used hydroxides at low temperatures are sodium hydroxide, potassium hydroxide, lithium hydroxide and barium hydroxide. Those hydroxides have a more pronounced effect on the setting time of the slag-containing cementitious slurry.

The usual concentrations of such hydroxides are between 0.01 and 5 weight % based on the weight of slag in the composition. Preferred concentrations are between 0.5 and 4 weight % based on the weight of slag, and the more preferred concentration is between 1 and 2 weight % based on the weight of slag of the composition of cementitious slurry.

Further, the compositions of the present invention may also contain a weaker alkaline metal base as part of the activator agent, for example, a carbonate or phosphate group-containing weaker base.

Specifically, the carbonate ion exerts a beneficial effect on the development of compressive strength and final compressive strength of the slag-containing mixture. A few anionic species may partly replace the carbonate of the activator, this causing a huge effect on the compressive strength. Alkaline metals and alkaline earth metal carbonates more commonly applied as a component of the overall activator comprise lithium carbonate, sodium carbonate, potassium carbonate, calcium carbonate, magnesium carbonate, barium carbonate, and sodium and potassium carbonate. Similarly to the alkali-containing hydroxyl groups, higher solubility provides stronger effects. More commonly used compounds, employed in the inventive compositions comprise sodium carbonate, potassium carbonate and sodium and potassium carbonate. The concentrations of those compounds used in the compositions of the invention comprise 0.01 and 8 weight % based on the weight of slag in the composition, the preferred composition being between 0.5 and 6 weight % based on the weight of slag in the composition, the optimum content being between 1.5 and 2.5 weight % based on the weight of slag present in the composition.

Therefore a typical composition of the invention comprises a total amount of activators between 0.01 weight % and 13 weight % based on the weight of slag, a strong base such as NaOH comprising between 0.01 and 5 weight % based on the weight of slag in the composition, while the weak base such as $Na_2CO_3$ is present in an amount between 0.01 and 8 weight % based on the weight of slag.

Analogously to the carbonate ion, the phosphate ion is an anionic chemical species, which may contribute to the compressive strength. However, the phosphate ion-containing compounds tend to retard the hydration of slag more strongly than does the carbonate ion. Basic phosphates such as sodium pyrophosphate, sodium hexamethaphosphate and tetrasodium polyphosphate find use in formulations for the control of setting time and aid in the development of the compressive strength. Among those, the sodium pyrophosphate shows the best potential. Typical concentrations are between 0.01 and 15 weight % based on the weight of slag, preferably between 0.5 and 8 weight % based on the weight of slag.

Citrate ion may also contribute to the compressive strength. Alkaline and alkaline earth metal salts of citric acid such as sodium citrate, calcium citrate, and potassium citrate are well known.

As for the rheological properties of the slurry, citrate and phosphate-containing compounds are advantageous when compared to carbonate or hydroxyl compounds. Citrate and phosphate-containing compounds are effectively dispersing agents for slag and clays in formulations of drilling fluids. Thus, said compounds make possible slurry compositions of lower water content or of better rheological properties.

Other components of the activator comprise a chelating, complexing or sequestering agent. Such compounds comprise the phosphate and citrate ion described hereinbefore. Other components are ethylene diamine tetracetic acid (EDTA) and their salts, phosphonic acids and their salts, glutamic acid and its salts, etc. It is preferable to use salts since the acidic forms react with added bases for the chemical activation. Soluble salts are preferred, such as sodium and potassium salts.

Concentration of activators is usually selected so as to provide maximum compressive strength for a given concentration in slag. The overall optimum concentration is referred based on the weight of slag used in the composition. This is how is selected the optimum ratio of activators to slag. The optimum weight ratio of activators to slag is reduced with the increase in temperature. Those optimum ratios may also vary with the compounds used as activators.

In the present invention, in the embodiment where the compositions are incompletely activated, the ratio of activators based on the slag is chosen so as to incompletely activate the slag so that the slag slurries be kept liquid at ambient temperature for prolonged periods, for example, 72 hours or more. Thus, this ratio is comprised, for example, for sodium hydroxide (NaOH) and sodium carbonate ($Na_2CO_3$) between 0.01% and 13 weight % based on the weight of slag present in the composition, preferably between 1.0 and 10 weight % and more preferably between 1.5% and 4.5 weight %.

As for the embodiment where the composition is kept free of the addition of activators up to immediately before the composition is pumped into the wellbore, the ratio of activators may be any, provided the amount of activators make the set after placing the slurry in the wellbore. It is well known, for example, that the excess of activators prevents the setting of the slurry.

In the embodiment of the invention where a portion of the required amount of activators is added in the amount of 0.01% to 13 weight % based on the weight of slag in the composition of slurry, and immediately before pumping the slurry to the wellbore, another portion of the activators is added, such amount may be any provided the slurry is set within the wellbore.

For the purposes of the present invention, ambient temperature means that one since which the slurry may be processed, up to usual ambient temperatures, for example, 25 to 30° C. For countries with ambient temperatures higher than 30° C., the amount of activators should be adapted to lower limits, since there will be a certain surface activation due to higher ambient temperatures.

Contrary to the publications of the literature and in a way not cited nor suggested, which renders the present invention patentably distinguishable from all published matters, the invention does not make use of set inhibitors. (retarders). On its turn, as is thoroughly explained in the referred to publications, the use of inhibitors requires, in order that the slurry composition be activated, the additional use of activators to neutralize the effect of inhibitors. It is evident that such additional chemical reagents and the consequent operations of mixture and human labor increase the costs of the cementing operation as reported in the state-of-the-art publications.

On the contrary, in one of the preferred modes of the invention, the slurry in insufficiently activated with chemical activators so that the set does not quickly occur at ambient temperature, however sufficiently activated so that the set quickly occurs within the wellbore.

In another mode, the slurry is not activated so that the set does not occur at ambient temperature, however, chemical activators are added immediately before the slurry is pumped into the wellbore, so that the slurry is quickly set at the temperature of the wellbore. This feature makes possible that the slurry may be prepared in advance, improving the quality as a result of the composition being uniform and also reducing the time of operation, since it is only necessary to displace the slurry to the wellbore.

For two formulations of the inventive slurries having optimized slag ratios and activators, the more dispersed formulation will develop as a whole better compressive strength after setting. Several complexing, sequestering or chelating agents mentioned above are good dispersing agents for slag containing drilling fluids.

Generally, in the laboratory the storable compositions of the invention may be prepared by mixing blast furnace slag, the additives in the right amount and the aqueous continuous phase. The order of addition of the constituents is not critical, however it is preferred to add first the water based fluids, followed by cementing and drilling additives, activators and slag.

The mixture is prepared in an agitator with controlled rotating speed such as a Waring blender. Constituents are weighed in a scale having a precision of 0.01 g. After weighing, the water-based fluids (water based drilling fluid, fresh water, brine, etc) are added to the cup of the blender and agitated under a rotation of 4,000 rpm, during around 15 seconds. The solid constituents are added over that liquid mixture one after the other, under a rotation of 4,000 rpm, for a period of time sufficient so that all constituents are dispersed or dissolve in the slurry being prepared. During the addition of slag, at the end of the mixture, the rotation is generally increased to 12,000 rpm in order to improve and facilitate its dispersion in the slurry. Mixing time may take from a few seconds to a few minutes. Generally, additives and activators are agitated for around 50 seconds, while the slag may be agitated for a few minutes.

In the laboratory, the assessment of the properties of the slurry is effected through tests such as compressive strength, thickening time, rheology, filtrate (fluid loss), density and free water. Those tests are effected according to SPECIFICATIONS 10 of the American Petroleum Institute (API).

Before storing the slurry for assessing the storage time, the properties of the composition are measured so as to ascertain its suitability to oil and gas wells. Once the suitability of the slurry is assessed, the slurry is prepared, the rheological parameters (plastic viscosity, yield point and gels) are measured and then the slurry is stored in capped flasks in order to avoid loss of water. The rheological parameters are periodically measured at 27° C. in order to monitor how the properties of the slurries have been modified. Whenever the slurry is too viscous and gelled, it is difficult to pump and therefore its properties are no longer suitable, the set is reached in a few hours. On stating the hardening of the slurry (set), the test is put to an end and the storage time is counted as the number of days between the preparation of the slurry and the day before the setting.

In the field, the storable compositions of the invention are prepared in a mixing tank of the rig or of the cementing unit (this is a tank provided with mechanical agitators and/or hydraulic recirculation). The constituents are weighed in a scale of 1-kg precision. After weighing, the water-based fluids (water based drilling fluid, plain water, brine, etc.) are added to the mixing tank and agitated for a few minutes. The solid constituents are added on that liquid mixture one after the other, in a period of time such that such constituents disperse or dissolve in the slurry, which is being prepared. Normally a few hours are needed to prepare a slurry.

The present invention will now be illustrated by the following examples, which should not be construed as limiting same.

EXAMPLE 1

During the cementing operation of the casing having 9⅝" diameter (0.244 m) of a well from the Parana basin, county of Pitangas, Brazil, a sample of the slurries prepared in the cementing unit was collected before being displaced to the well. Two slurries were used in the well. The first, called extended, was placed over the second slurry, called.normal, which was placed near the shoe of the casing.

TABLE 2 shows the composition of the extended slurry used in the well under study. A sample of such slurry was stored for 3 days at ambient temperature (around 24° C.) and not setting (solidification) occurred. Immediately after the collection of the sample the compressive strength was determined, which after curing for 24 hours at 55° C. (131° F., static temperature of the well), was 1220 psi (8.412 MPa). The obtained value is suitable for cementing of casing. The CBL/VDL/CET logging of the well indicates that the slurry has fulfilled the goals of the cementing operation.

TABLE 2

| Constituent | Concentration |
| --- | --- |
| $H_2O$ | 74.2% by volume |
| Starch | 1.25 lb/bbl (3.57 $Kg/m^3$) |
| Active Clay | 2.4 weight % based on the weight of slag |
| NaOH | 1.5 weight % based on the weight of slag |
| $Na_2CO_3$ | 2.5 weight % based on the weight of slag |
| Blast furnace slag | 250 lb/bbl (713 $Kg/m^3$) |

TABLE 3 below shows the composition of the normal slurry used in the well under study. A sample of said slurry was stored for 16 days at ambient temperature, around 24° C., and no solidification occurred. The compressive strength at 8 hours curing at a temperature of 84° C. (184° F., bottom hole static temperature) measured 3 and 16 days after preparing the slurry, was respectively 1017 psi (7.012 Mpa) and 1000 psi (6.895 Mpa). Those values are suitable for the purposes of the casing cementing.

TABLE 4 below shows that the rheological parameters of the slurry undergo minor changes with storage time. The cement logging of the well indicated a good cementing quality.

TABLE 3

| Constituent | Concentration |
|---|---|
| Low solids Drilling fluid | 32% by volume |
| H₂O | 33% by volume |
| Fluid Loss Additive | 0.1 weight % based on the weight of slag |
| NaOH | 1.2 weight % based on the weight of slag |
| Na₂CO₃ | 2.0 weight % based on the weight of slag |
| Dispersant | 1.5 lb/bbl (4.28 Kg/m³) |
| Blast furnace slag | 350 lb/bbl (999 Kg/m³) |

TABLE 4

| Rheology @ 27° C. (80° F.) | 5 days | 6 days | 10 days |
|---|---|---|---|
| Plastic Viscosity | 1.12 P | 0.94 P | 0.91 P |
| Yield Point | 4 lbf/100 ft² (1.9 Pa) | 7 lbf/100 ft² (3.4 Pa) | 7 lbf/100 ft² (3.4 Pa) |
| Gel 10 s | 3 lbf/100 ft² (1.4 Pa) | 3 lbf/100 ft² (1.4 Pa) | 6 lbf/100 ft² (2.9 Pa) |
| Gel 10 min | 20 lbf/100 ft² (9.6 Pa) | 18 lbf/100 ft² (8.6 Pa) | 30 lbf/100 ft² (14.4 Pa) |

EXAMPLE 2

A sample of the slurry was put aside immediately after being prepared, before the displacement to a well in the Northeast Production Area, state of Rio Grande do Norte, Brazil. TABLE 5 below shows the composition of the slurry used in the cementing of the casing of the production well under study. The sample was stored for 24 days at ambient temperature (around 24° C.) in the absence of solidification. The compressive strength values in 24 hours curing time at 73° C. (164° F., bottom hole static temperature) as measured immediately after the slurry was prepared and 6 days after, were respectively 1900 psi (13.10 MPa) and 1810 psi (12.84 Mpa).

TABLE 6 below shows further properties of said slurry. Those values are suitable for cementing the production casing.

TABLE 7 below shows that the rheological parameters of the slurry undergo only slight changes with the storage time. The cement logging of the well indicated a suitable cementing performance.

TABLE 5

| Constituent | Concentration |
|---|---|
| Drilling fluid | 42.5% by volume |
| Industrial water | 20.8% by volume |
| Fluid Loss Additive | 3.66 lb/bbl (10.4 Kg/m³) |
| NaOH | 1.2 weight % based on the weight of slag |
| Na₂CO₃ | 3.1 weight % based on the weight of slag |
| Dispersant | 1.1 lb/bbl (3.1 Kg/m³) |
| Blast Furnace Slag | 356 lb/bbl (1016 Kg/m³) |

TABLE 6

| Property | Test Temperature (° C.) | Value read |
|---|---|---|
| Density lb/gal (Kg/m³) | 20 | 14.8 (1.773) |
| Fluid Loss cm³/30 min m³/s | 51 | 26 (1.4 × 10⁻⁸) |
| Plastic Viscosity. Pa | 27 | 1.39 |
|  | 51 | 0.81 |
| Yieldpoint. lbf/100 ft² (Pa) | 27 | 41 (19.6) |
|  | 51 | 12 (5.7) |
| Initial Gel lbf/100 ft² (Pa) | 27 | 27 (12.9) |
|  | 51 | 8 (3.8) |
| FinalGel lbf/100 ft² (Pa) | 27 | 38 (18.2) |
|  | 51 | 20 (9.6) |
| Free water. cm³/2h (m³) | 27 | Zero (zero) |

TABLE 7

| Rheology @ 27° C. (80° F.) | Start | 3 days | 8 days | 23 days |
|---|---|---|---|---|
| Plastic Viscosity (Pa) | 1.39 | 1.54 | 1.66 | 1.71 |
| Yield Point lbf/100 ft² | 41 | 37 | 44 | 92 |
| (Pa) | 19.6 | 17.7 | 21.1 | 44.0 |
| Gel 10 s lbf/100 ft² | 27 | 24 | 25 | 87 |
| (Pa) | 12.9 | 11.5 | 12.0 | 41.7 |
| Gel 10 min lbf/100 ft² | 38 | 37 | 46 | 105 |
| (Pa) | 18.2 | 17.7 | 22.0 | 50.3 |

FURTHER EXAMPLES

TABLE 8 below shows formulations A up to H which are examples of slag slurry which remained liquid at ambient temperature for at least 7 days and solidify in a few hours at the temperature of the well.

TABLE 8

| Formulation | A | B | C | D | E | F | G | H |
|---|---|---|---|---|---|---|---|---|
| Drilling Fluid (% by volume) | 0.607 | 0.403 | 0.403 | 0.403 | 0.403 | 0.35 | 0.354 | 0.324 |

TABLE 8-continued

|  | A | B | C | D | E | F | G | H |
|---|---|---|---|---|---|---|---|---|
| Water (% by volume) | — | 0.283 | 0.283 | 0.283 | 0.283 | 0.35 | 0.354 | 0.324 |
| NaOH (weight % based on the weight of slag) | 1 | 1 | 1 | 1 | 1 | 2 | 4 | 0 |
| $Na_2CO_3$ (weight % based on the weight of slag) | 1.5 | 2 | 2 | 2 | 2 | 6 | 6 | 1.5 |
| Dispersant lb/bbl | 2.5 | 2 | 2 | 2 | 2 | 1 | 1 | 2 |
| ($Kg/m^3$) | 7.1 | 5.7 | 5.7 | 5.7 | 5.72 | 2.9 | 2.9 | 5.7 |
| Fluid loss additive (weight % based on the weight of slag) | — | 0.78 | 0.78 | 0.78 | 0.78 | — | — | 1.2 |
| Temperature stabilizer (weight % based on the weight of slag) | — | 1.17 | 1.17 | 1.17 | 1.17 | — | — | — |
| Slag lb/bbl | 400 | 300 | 300 | 300 | 300 | 300 | 300 | 350 |
| ($Kg/m^3$) | 1.141 | 856 | 856 | 856 | 856 | 856 | 856 | 999 |
| Surface area ($m^2/Kg$) | 400 | 400 | 582 | 582 | 235 | 400 | 236 | 400 |
| Properties |  |  |  |  |  |  |  |  |
| Compressive psi | 960 | 2,630 | 1,782 | 1,782 | 2,371 | 1,160 | 1,282 | 1,160 |
| Strength[1] (Mpa) | 6.62 | 18.13 | 12.29 | 12.29 | 16.35 | 8.00 | 8.84 | 8.00 |
| Curing Temperature (° C.) | 80 | 150 | 150 | 150 | 150 | 80 | 120 | 98 |
| Storage Time (days) | 20 | >50 | >59 | 31 | >104 | 7 | 7 | >27 |
| Storage Temperature (° C.) | 22 | 22 | 22 | 35 | 22 | 22 | 22 | 22 |

[1]Curing period: 24 hours

Formulation of TABLE 9 is formulation F of TABLE 8 without the addition of activators NaOH and $Na_2CO_3$. Formulation I was kept fluid for more than 67 days. By adding activators after 28 days, the slurry subjected to the curing temperatures of formulation F, 80° C., showed the highest compressive strength, 1,626 psi (11.21 MPa), which is suitable for cementing oil wells.

TABLE 9

| Formulation | I |
|---|---|
| Drilling fluid (% by volume) | 35 |
| Water(% by volume) | 35 |
| NaOH (weight % based on the weight of slag) | — |
| $Na_2CO_3$ (weight % based on the weight of slag) | — |
| Dispersant lb/bbl | 1.0 |
| ($Kg/m^3$) | 2.9 |
| Slag lb/bbl | 300 |
| ($Kg/m^3$) | 856 |
| Surface area ($m^2/Kg$) | 400 |
| Properties |  |
| Compressive strength[1] psi | *1,626 |
| (Mpa) | *11.61 |
| Curing Temperature (° C.) | 80 |
| Storage Time (days) | >67 |
| Storage Temperature (° C.) | 22 |

[1]Curing Period 24 hours
*Assessed after 28 days storage, by adding 2 lb/bbl (5,7 $Kg/m^3$) NaOH and 6 lb/bbl (17,1 $Kg/m^3$) $Na_2CO_3$.

We claim:

1. A storable composition for cementing oil and gas wells, containing blast-furnace slag as hydraulic material, activators, additives and an aqueous continuous phase forming a cementitious slurry,
   wherein
   the amount of activators in said composition based on the amount of slag is insufficient to effect the setting of the cementitious slurry for at least 72 hours at ambient temperature while providing an effective set time up to 24 hours in a wellbore at the wellbore temperature,
   said composition does not include a set inhibitor, and the composition comprises:
   (a) from 200 to 500 lb of blast-furnace slag per each bbl of slurry to be prepared; and
   (b) from 0.01 weight % to 13 weight % of activators, based on the weight of said slag;
   (c) the balance of the composition being made up of an aqueous continuous phase fluid and additives.

2. The storable composition according to claim 1, wherein the setting of said composition is obtained by combining the chemical action of the activators and the thermal action of the temperature of the well bottom.

3. The storable composition according to claim 1, wherein the blast-furnace slag is a by-product from the melting of iron ores.

4. The storable composition according to claim 1, wherein the activator comprises one or more alkali compounds, isolated or in admixture, combined or not with chelating, complexing or sequestering agents.

5. The storable composition according to claim 1, wherein the amount of activator is between 0.1 to 10 weight % based on the weight of slag in the composition.

6. The storable composition according to claim 1, wherein the activator contains a strong base selected from the group consisting of alkaline hydroxides, earth alkaline hydroxides, lithium hydroxide, sodium hydroxide, potassium hydroxide, calcium hydroxide, magnesium hydroxide, and barium hydroxide.

7. The storable composition according to claim 6, wherein the alkali is a sodium hydroxide, potassium hydroxide or a mixture of same, said alkali being present in an amount of 0.01 to 5 weight % based on the amount of slag in the composition.

8. The storable composition according to claim 1, wherein the activator contains a weak base selected from the group consisting of basic carbonates, lithium carbonate, sodium carbonate, potassium carbonate, calcium carbonate, magnesium carbonate, barium carbonate, sodium and potassium carbonate, basic phosphates, sodium pyrophosphate, sodium hexamethaphosphate, tetrasodium polyphosphate, metal salts of citric acid, sodium citrate, calcium citrate, and potassium citrate.

9. The storable composition according to claim 8, wherein the weak base comprises a carbonate ion.

10. The storable composition according to claim 9, wherein the carbonate ion is a sodium carbonate, a potassium carbonate or a mixture of same, in an amount of 0.01 to 8 weight % based on the weight of slag in the composition.

11. The storable composition according to claim 8, wherein the weak base comprises a phosphate ion.

12. The storable composition according to claim 11, wherein the phosphate ion is a basic phosphate selected from the group consisting of sodium pyrophosphate, sodium hexamethaphosphate and tetrasodium polyphosphate, in an amount between 0.01 and 15 weight % based on the weight of slag.

13. The storable composition according to claim 4, wherein the chelating, sequestering or complexing agents comprise phosphates, citrates, ethylene diamine tetracetic acid and its salts, phosphonic acids and their salts, glutamic acid and its salts in an amount between 0.01% and 15 weight % based on the weight of slag.

14. The storable composition according to claim 1, wherein the aqueous continuous phase fluid comprises a fluid where the continuous phase comprises ordinary fresh water, brine, or sea water, isolated or in admixture, or any other aqueous drilling fluid.

15. A cementitious slurry useful for cementing oil and gas wells the composition of which is according to claim 1, wherein the slurry is prepared by admixing the constituents in a tank provided with mechanical and/or hydraulic circulation agitators, the solid constituents being added on the mixture of aqueous continuous phase fluids, one at a time, during a sufficient time so that said solids are dispersed or dissolved in the liquid phase, the slurry being kept fluid for at least 72 hours at ambient temperature.

16. The storable composition according to claim 5, wherein the amount of activator is between 1.5 and 4.5 weight % based on the weight of slag in the composition.

17. The storable composition according to claim 6, wherein the alkali is a sodium hydroxide, potassium hydroxide or a mixture of same, said alkali being present in an amount of between 0.5 and 4 weight % based on the amount of the slag in the composition.

18. The storable composition according to claim 6, wherein the alkali is a sodium hydroxide, potassium hydroxide or a mixture of same, said alkali being present in an amount of between 1 and 2 weight % based on the amount of the slag in the composition.

19. The storable composition according to claim 9, wherein the carbonate ion is a sodium carbonate, a potassium carbonate or a mixture of same, in an amount of between 0.5 and 2.5 weight % based on the weight of slag in the composition.

20. The storable composition according to claim 9, wherein the carbonate ion is a sodium carbonate, a potassium carbonate or a mixture of same, in an amount of between 1.5 and 2.5 weight % based on the weight of slag in the composition.

21. The storable composition according to claim 11, wherein the phosphate ion is a basic phosphate selected from the group consisting of sodium pyrophosphate, sodium hexamethaphosphate and tetrasodium polyphosphate, in an amount between 0.5 and 8.0 weight % based on the weight of slag.

22. The storable composition according to claim 4, wherein the chelating, sequestering or complexing agents comprise phosphates, citrates, ethylene diamine tetracetic acid and its salts, phosphonic acids and their salts, glutamic acid and its salts in an amount between 0.5% and 8 weight % based on the weight of slag.

23. A cementitious slurry useful for cementing oil and gas wells according to claim 15, wherein the effective amount of activator is added immediately before the slurry is being pumped into the well while providing an effective set time up to 24 hours in the wellbore.

24. A cementitious slurry useful for cementing oil and gas wells according to claim 15, wherein the effective amount of activator is added in two partition steps, a sufficient amount to keep the storable slurry composition suspended at ambient temperature and a complement amount immediately before the slurry is being pumped into the well while providing an effective set time up to 24 hours in the wellbore.

25. The storable composition of claim 1, wherein the activators comprise a base or mixture of bases selected from the group consisting of lithium hydroxide, sodium hydroxide, potassium hydroxide, calcium hydroxide, magnesium hydroxide, barium hydroxide, lithium carbonate, sodium carbonate, potassium carbonate, calcium carbonate, magnesium carbonate, barium carbonate, sodium and potassium carbonate, sodium pyrophosphate, sodium hexamethaphosphate and tetrasodium polyphosphate.

26. The storable composition of claim 25, herein the activators are sodium hydroxide and sodium carbonate.

27. The storable composition of claim 1, wherein the additives are selected from the group consisting of extenders, strength retrogression controllers, accelerators, fluid loss additives, dispersants and weighting agents.

28. The storable composition of claim 27, wherein the additives are selected from the group consisting of a dispersant, a fluid loss additive, and a temperature stabilizer.

* * * * *